(12) United States Patent
Cseri et al.

(10) Patent No.: US 10,997,148 B2
(45) Date of Patent: *May 4, 2021

(54) PROCESSING TRANSACTIONS ON JOURNALED TABLES

(71) Applicant: Snowflake Inc., San Mateo, CA (US)

(72) Inventors: Istvan Cseri, Seattle, WA (US); Torsten Grabs, San Mateo, CA (US); Thierry Cruanes, San Mateo, CA (US); Subramanian Muralidhar, Mercer Island, WA (US); Benoit Dageville, San Mateo, CA (US)

(73) Assignee: Snowflake Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/078,437

(22) Filed: Oct. 23, 2020

(65) Prior Publication Data
US 2021/0042283 A1 Feb. 11, 2021

Related U.S. Application Data

(63) Continuation of application No. 16/727,385, filed on Dec. 26, 2019, now Pat. No. 10,846,277, which is a
(Continued)

(51) Int. Cl.
*G06F 16/22* (2019.01)
*G06F 16/21* (2019.01)
*G06F 16/23* (2019.01)

(52) U.S. Cl.
CPC ........ *G06F 16/2282* (2019.01); *G06F 16/219* (2019.01); *G06F 16/2358* (2019.01)

(58) Field of Classification Search
CPC . G06F 16/2282; G06F 16/219; G06F 16/2358
(Continued)

(56) References Cited

U.S. PATENT DOCUMENTS 6,289,335 B1 9/2001 Downing et al.
8,046,327 B2 10/2011 Brodersen et al.
(Continued)

FOREIGN PATENT DOCUMENTS

WO WO-2013166520 A1 11/2013
WO 2020232096 11/2020

OTHER PUBLICATIONS

"U.S. Appl. No. 16/410,695, Preliminary Amendment Filed Dec. 26, 2019", 14 pgs.
(Continued)

*Primary Examiner* — Robert W Beausoliel, Jr.
*Assistant Examiner* — Arthur Ganger
(74) *Attorney, Agent, or Firm* — Schwegman Lundberg & Woessner, P.A.

(57) ABSTRACT

The subject technology receives one or more requests to execute one or more requested transactions on a journal table of a database, the journal table comprising a snapshot and a log table. The subject technology, based on the one or more requests, inserts a new row into the log table for each requested transaction, each new row reflecting a corresponding requested transaction. The subject technology receives, after the one or more requested transactions have been executed, a second request to execute a second requested transaction on the journal table. The subject technology generates, prior to executing the second requested transaction, a second snapshot, the second snapshot comprising a second representation of data in the journal table after the one or more requested transactions have been executed, the second snapshot stored in a third micro-partition different than the first micro-partition and the second micro-partition.

30 Claims, 13 Drawing Sheets

Related U.S. Application Data continuation of application No. 16/410,695, filed on May 13, 2019.

(58) Field of Classification Search
USPC .......................................................... 707/802
See application file for complete search history.

(56) References Cited

U.S. PATENT DOCUMENTS

| | | |
|---|---|---|
| 10,846,277 B1 | 11/2020 | Cseri et al. |
| 2013/0218840 A1 | 8/2013 | Smith et al. |
| 2013/0311421 A1 | 11/2013 | Erdogan et al. |
| 2016/0147809 A1 | 5/2016 | Schreter et al. |
| 2016/0154866 A1* | 6/2016 | Teletia .................. G06F 16/284 707/687 |
| 2018/0004650 A1 | 1/2018 | Battaje et al. |
| 2019/0102418 A1 | 4/2019 | Vasudevan et al. |
| 2019/0372924 A1 | 12/2019 | Waltz et al. |
| 2020/0012568 A1 | 1/2020 | Vig et al. |
| 2020/0026789 A1 | 1/2020 | Quakkelaar |
| 2020/0364200 A1 | 11/2020 | Cseri et al. |
| 2020/0364201 A1 | 11/2020 | Cseri et al. |

OTHER PUBLICATIONS

"U.S. Appl. No. 16/727,385, Non Final Office Action dated Mar. 20, 2020", 22 pgs.

"U.S. Appl. No. 16/727,385, Notice of Allowance dated Sep. 30, 2020", 5 pgs.

"International Application Serial No. PCT/US2020/032639, International Search Report dated Jul. 24, 2020", 2 pgs.

"International Application Serial No. PCT/US2020/032639, Written Opinion dated Jul. 24, 2020", 12 pgs.

"U.S. Appl. No. 17/078,397, Notice of Allowance dated Dec. 24, 2020", 10 pgs.

* cited by examiner

Log Table

| TIME | PRIMARY KEY | VALUE | COMMENT |
| --- | --- | --- | --- |
| 1 | K1 | V11 | INSERT |
| 2 | K2 | V21 | INSERT |
| 3 | K1 | V12 | UPDATE |
| 4 | K1 | V13 | UPDATE |
| 5 | K3 | V31 | INSERT |
| 6 | K2 | V22 | UPDATE |

```
┌─────────────────────────────────────────────────────────────────────────┐
│ Defining A Journal Table Comprising A Snapshot And A Log Table, The Snapshot │
│ Comprising An Up-To-Date Representation Of Data In The Journal Table At A Point In │
│                                  Time.                                  │
│                                  1202                                   │
└─────────────────────────────────────────────────────────────────────────┘
```

```
┌─────────────────────────────────────────────────────────────────────────┐
│    Assigning A Timestamp To The Snapshot Indicating When The Snapshot Was │
│                                Generated.                                │
│                                   1204                                  │
└─────────────────────────────────────────────────────────────────────────┘
```

```
┌─────────────────────────────────────────────────────────────────────────┐
│ Receiving A Request To Execute A Transaction On The Journal Table To Modify The │
│ Data In The Journal Table, The Transaction Comprising One Or More Of An Insert, A │
│                       Delete, An Update, Or A Merge.                     │
│                                   1206                                  │
└─────────────────────────────────────────────────────────────────────────┘
```

```
┌─────────────────────────────────────────────────────────────────────────┐
│ Inserting A New Row Into The Log Table In Lieu Of Executing The Transaction On The │
│ Snapshot Of The Journal Table, The New Row Comprising An Indication Of A Change │
│        Requested To Be Made To The Journal Table Based On The Transaction. │
│                                   1208                                  │
└─────────────────────────────────────────────────────────────────────────┘
```

FIG. 12

PROCESSING TRANSACTIONS ON JOURNALED TABLES

CROSS-REFERENCE TO RELATED APPLICATIONS

The present application is a continuation of, and hereby claims priority under 35 U.S.C. § 120 to U.S. Non-Provisional patent application Ser. No. 16/727,385, entitled "JOURNALED TABLES IN DATABASE SYSTEMS," filed on Dec. 26, 2019, which is a continuation of U.S. Non-Provisional patent application Ser. No. 16/410,695, entitled "JOURNALED TABLES IN DATABASE SYSTEMS," filed on May 13, 2019, the contents of each are hereby incorporated in their entireties for all purposes.

TECHNICAL FIELD

The present disclosure relates to systems, methods, and devices for databases and more particularly relates to database table storage devices having a log table.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and the transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

Traditional database management requires companies to provision infrastructure and resources to manage the database in a data center. Management of a traditional database can be very costly and requires oversight by multiple persons having a wide range of technical skill sets. Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

In many instances, it is necessary that the database data can be updated by inserting information, removing information, or modifying information stored in the database. Some processes for updating database information can be very time and resource intensive. Specifically, inserting new information may not consume significant time or computing resources, but modifying or deleting existing information can be very expensive in terms of time and processing capacity. Because updating the database information can consume significant processing resources, some database owners choose to implement updates at off-peak hours when processing resources are not in high demand, and/or elect to execute batch updates to the database to reduce the overall amount of time and resources that are spent updating the database information. In many instances this is not a desirable solution because it causes the database data to be stale. This can in turn cause query results to be inaccurate.

In light of the foregoing, disclosed herein are systems, methods, and devices for storing database data in storage devices that include a log table. The systems, methods, and devices disclosed herein permit database data to be stale without impacting the accuracy of query results.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 6 is a block diagram illustrating an example log table of a journal table, according to one embodiment;

FIG. 12 is a schematic flow chart diagram of a method for storing data in a journal table of a database.

DETAILED DESCRIPTION

Figure 1:
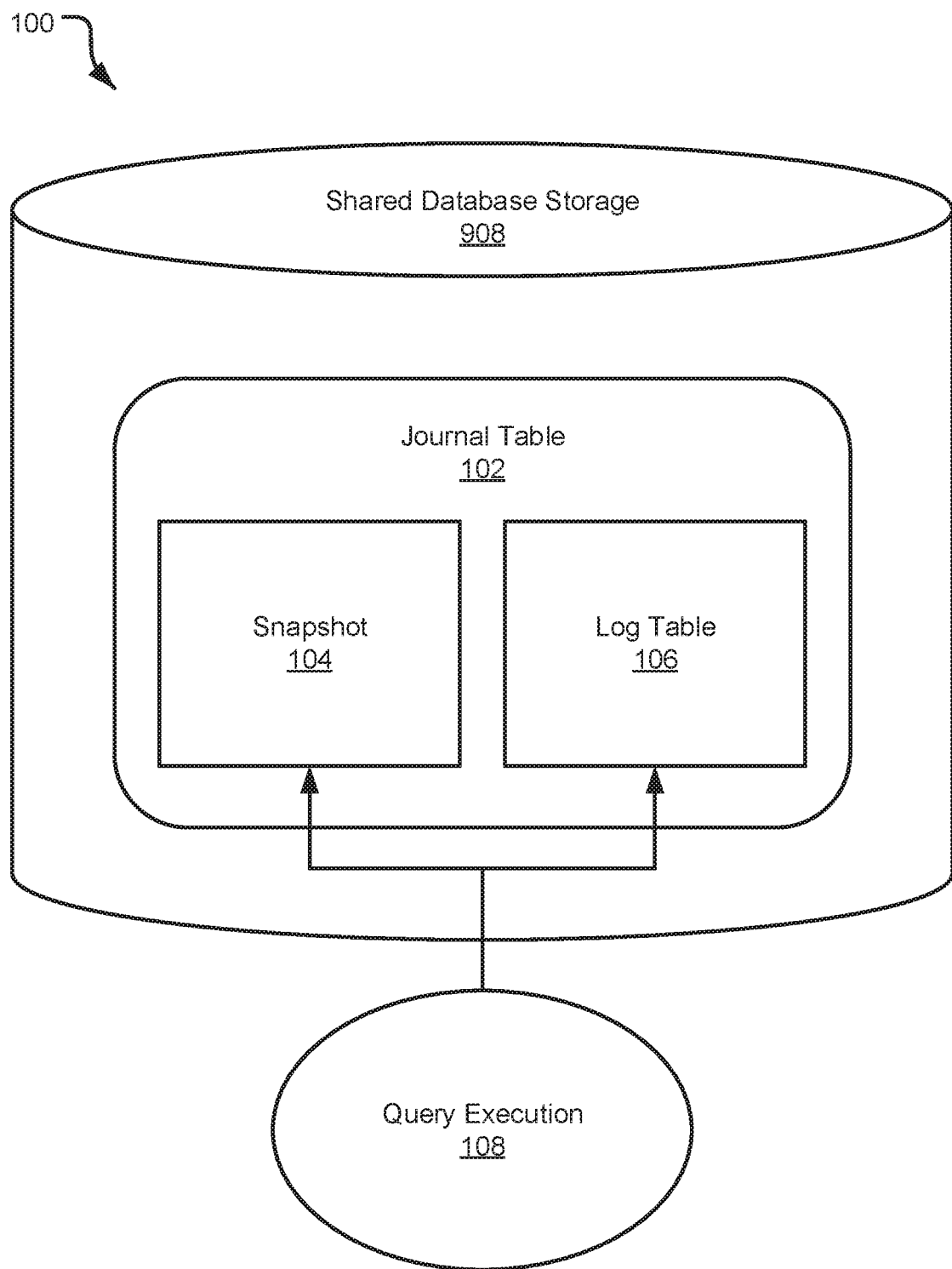
FIG. 1 is a schematic block diagram of a system for storing and querying data in a journal table, according to one embodiment.

Systems, methods, and devices for storing database data in a storage device having a log table are disclosed. The systems, methods, and devices of the disclosure permit database data to be stale with respect to transaction requests such as Data Manipulation (DML) commands without sacrificing the accuracy of query results. In an embodiment, database data is stored in a journal table including a snapshot and a log table. The snapshot is an up-to-date representation of data in the table at a point in time. The log table is a listing of all transaction requests that have been ordered and/or executed on the table at least since the latest refresh of the snapshot.

Database data can be changed by way of insert, delete, update, and merge commands. Such modifications may be referred to as a transaction that occurred on the database table. An insert command may add rows of data to a table of a database that may be part of different micro-partitions or tables in the database. A delete command may delete rows from the table. An update command may make a change to data that is already stored in the table. A merge command may add, update, or delete rows from the table. In an implementation, database data is stored in immutable storage devices referred to as "micro-partitions" that are never updated in-place. When any change is made to the data in a micro-partition, the entire micro-partition is regenerated. Because an insert command only adds new rows to a table, those new rows can be added to one or more new micro-partitions, and no existing micro-partitions need to be altered. Because update, delete, and merge commands may update or delete rows across one or more micro-partitions, those commands tend to be much more expensive than update commands. These operations can be especially expensive because the micro-partitions having the relevant rows need to be identified before the command can be executed.

In some instances, insert commands can be executed without consuming significant time or resources. New data may be ingested into the database and a new micro-partition may be generated that includes the new data. This does not impact any existing micro-partitions or tables and can be executed quickly. However, changes to existing data can be more problematic and can consume significant time and computing resources.

Update, merge, and delete commands can be costly to execute in terms of time and processing resources. An example update command may be issued on table that has many thousands of micro-partitions. The example update command may change only one cell in one row of the thousands of rows of one of the thousands of micro-partitions. To execute this update command, the candidate micro-partition(s) must be identified from the thousands of micro-partitions. For each of those candidate micro-partitions, the entire micro-partition must be regenerated with the original cell removed and a replacement cell inserted in its place. This can be an expensive operation that consumes significant time and resources. Because update, merge, and delete commands can be very costly, clients may elect to delay such operations and execute them in batches. In an example, a client may hold all update, merge, and delete commands that are issued throughout the day and have those commands executed during non-peak hours when fewer processing resources are being utilized. This is not an ideal solution. When such operations are delayed, the database does not have the latest data. When a client elects to delay expensive operations, it may be presumed that the database always has some stale data that will return inaccurate query results. Therefore, it is desirable to provide a low cost means to ensure that query results are accurate with respect to any modifications that have been made to the table while ensuring that the modifications to the table are not as expensive.

In light of the foregoing, the systems, methods, and devices disclosed herein provide low cost means to execute database queries that return only up-to-date data. An embodiment of the disclosure employs a journal table to ensure that a query result is not stale with respect to any modifications that have been made to the data since the last time the data was refreshed. An embodiment of the journal table includes two parts, including a snapshot and a log table. The snapshot includes all data at a particular point in time. The log table includes all changes that have been ordered and/or executed at least since the particular point in time.

The journal table may be analogized to banking operations to enable further understanding. In an example, a user requests the most updated info for a banking account. The user could view a bank ledger that includes a listing of all transactions made on the banking account, including deposits and withdrawals. To speed up this operation, the bank may produce an end-of-day balance for the banking account for the end of business one day prior. The bank may further produce a ledger of transactions that occurred since the end of business one day prior. Those transactions may be applied to the end-of-day balance to determine the current balance for the banking account.

In the analogy, the snapshot of the journal table may be analogized to the end-of-day balance for the banking account. The snapshot includes all data at a particular point in time. The snapshot may include all data in a table of the database, a micro-partition of the database, or some other organizational structure of the database. The snapshot includes a timestamp indicating when the snapshot was generated and/or when the data was last updated. Further in the analogy, the log table may be analogized to the ledger of transactions that occurred since the end of business one day prior (i.e., since the end-of-day balance was determined). The log table includes a listing of all transactions that have been ordered on the data since the snapshot was generated. The log table may include a listing of Data Manipulation Language (DML) commands such as insert, delete, and/or update commands. The journal table is the combination of the snapshot and the log table. The journal table may be used to execute a query on the data and ensure that the query results are accurate and up-to-date even when the snapshot is stale.

In an embodiment, a method includes generating a snapshot of a table of a database, the snapshot comprising an up-to-date representation of data in the table at a point in time. The method includes assigning a timestamp to the snapshot indicating when the snapshot was generated. The method includes receiving a request to execute a transaction on the table, the request comprising one or more of an insert, a delete, an update, or a merge. The method includes adding the transaction to a log table associated with the snapshot in lieu of executing the transaction on the table.

A database table may store data in a plurality of micro-partitions, wherein the micro-partitions are immutable storage devices. When a transaction is executed on a such a table, all impacted micro-partitions are recreated to generate new micro-partitions that reflect the modifications of the transaction. After a transaction is fully executed, any original micro-partitions that were recreated may then be removed from the database. A new version of the table is generated after each transaction that is executed on the table. The table may undergo many versions over a time period if the data in the table undergoes many changes, such as inserts, deletes, updates, and/or merges.

The micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular pruning of very large tables, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

In one embodiment, data is stored and maintained on non-mutable storage services in the cloud. These storage services may include, for example, Amazon S3®, Microsoft Azure Blob Storage @, and Google Cloud Storage @. Many of these services do not allow to update data in-place (i.e., are non-mutable or immutable). Data files may only be added or deleted, but never updated. In one embodiment, storing and maintaining data on these services requires that, for every change in data, a data file (a micro-partition) is added to the storage service.

An analogy to the micro-partitions of the table may be different storage buildings within a storage compound. In the analogy, the storage compound is similar to the table, and each separate storage building is similar to a micro-partition. Hundreds of thousands of items are stored throughout the storage compound. Because so many items are located at the storage compound, it is necessary to organize the items across the multiple separate storage buildings. The items may be organized across the multiple separate storage buildings by any means that makes sense. For example, one storage building may store clothing, another storage building may store household goods, another storage building may store toys, and so forth. Each storage building may be labeled so that the items are easier to find. For example, if a person wants to find a stuffed bear, the person will know to go to the storage building that stores toys. The storage building that stores toys may further be organized into rows of shelving. The toy storage building may be organized so that all stuffed animals are located on one row of shelving. Therefore, the person looking for the stuffed bear may know to visit the building that stores toys and may know to visit the row that stores stuffed animals. Further to the analogy with database technology, the storage compound is similar to the table of the database. Each individual storage building is similar to the micro-partitions within the table of the database. A row of shelving in the storage building is similar to a column of data within a micro-partition of the table. The labels for each storage building and for each row of shelving are similar to metadata in a database context.

Similar to the analogy of the storage compound, the micro-partitions disclosed herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data. For example, if the database client is a credit card provider and the data is credit card transactions, the table may include columns such as credit card number, account member name, merchant name, date of card transaction, time of card transaction, type of goods or services purchased with card, and so forth. The table may include millions and millions of credit card transactions spanning a significant time period, and each credit card transaction may be stored in one row of the table. Because the table includes so many millions of rows, the table may be partitioned into micro-partitions. In the case of credit card transactions, it may be beneficial to split the table based on time. For example, each micro-partition may represent one day or one week of credit card transactions. It should be appreciated that the table may be partitioned into micro-partitions by any means that makes sense for the database client and for the type of data stored in the table. The micro-partitions provide significant benefits for managing the storage of the millions of rows of data in the table, and for finding certain information in the table.

Some insert commands add new data to the table that may be stored in a new micro-partition without altering or recreating any existing micro-partitions. For example, a table may have 500 existing micro-partitions and the new data added to the table may cause the generation of micro-partition number 501 and micro-partition number 502. These new micro-partitions 501 and 502 are created to store the new data. The 500 existing micro-partitions are not modified or recreated by this insert command. An insert command of this nature is not costly to execute because it does not alter any existing micro-partitions. Such an insert command does not require significant time or processing resources and may be executed immediately.

However, there exist many other commands that may cause an existing micro-partition to be altered or recreated. Delete commands cause an existing micro-partition to be regenerated with the deleted rows removed. Update commands cause an existing micro-partition to be regenerated with the updated rows removed and replaced. Merge commands cause existing micro-partitions to be regenerated with the merged rows removed and replaced. Such commands can be very costly to execute in terms of time and processing resources. Some clients may wish to postpone the execution of such commands so that regular database operations are not impacted when processing resources are diverted to executing the costly commands. This causes database data to be stale and may result in inaccurate query results. Therefore, it is not ideal to immediately execute costly commands or to postpone such commands. The disclosures herein solve this issue by implementing a novel database structure referred to as a journal table.

The journal table disclosed herein enables costly commands to be postponed without sacrificing the accuracy of queries that are processed before the costly command can be executed. Therefore, the journal table disclosed herein enables expensive operations on the table to be deferred without cause query results to be stale. The journal table includes a snapshot and a log table. The snapshot includes all data in the table at a certain timestamp. The log table includes a listing of changes that need to be applied to the table since the snapshot was last generated. When a query is executed against the journal table, the changes in the log are combined with the contents of the snapshot to produce consistent results.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for the purpose of clarity, certain technical material that is known in the related art has not been described in detail to avoid unnecessarily obscuring the disclosure.

In an embodiment, file metadata is stored within metadata storage. The file metadata contains table versions and information about each table data file. The metadata storage may include mutable storage (storage that can be over written or written in-place), such as a local file system, system, memory, or the like. In one embodiment, the micro-partition metadata consists of two data sets: table versions and file information. The table versions data set includes a mapping of table versions to lists of added files and removed files. File information consists of information about each micro-partition, including micro-partition path, micro-partition size, micro-partition primary key id, and summaries of all rows and columns that are stored in the micro-partition, for example. Each modification of the table creates new micro-partitions and new micro-partition metadata. Inserts into the table create new micro-partitions. Deletes from the table remove micro-partitions and potentially add new micro-partitions with the remaining rows in a table if not all rows in a micro-partition were deleted. Updates remove micro-partitions and replace them with new micro-partitions with rows containing the updated records.

In one embodiment, metadata may be stored in metadata micro-partitions in immutable storage. In one embodiment, a system may write metadata micro-partitions to cloud storage for every modification of a database table. In one embodiment, a system may download and read metadata micro-partitions to compute the scan set. The metadata micro-partitions may be downloaded in parallel and read as they are received to improve scan set computation. In one embodiment, a system may periodically consolidate metadata micro-partitions in the background. In one embodiment, performance improvements, including pre-fetching, caching, columnar layout and the like may be included. Furthermore, security improvements, including encryption and integrity checking, are also possible with metadata files with a columnar layout.

Referring now to the figures, FIG. 1 is a schematic block diagram of a system 100 for query execution by reading a journal table. The journal table 102 may be stored across one or more storage devices associated with shared database storage 908 (see FIG. 9). In an embodiment, the journal table 102 is a table comprising database data that is distributed across multiple immutable storage devices referred to herein as micro-partitions. The journal table 102 includes a snapshot 104 that comprises database data in a tabular format along with a timestamp indicating the last refresh of the snapshot 104. The journal table 102 further includes a log table 106 indicating all transactions that have been ordered and/or executed on the journal table 102 since the last refresh of the snapshot 104. Query execution 108 is performed by referencing the snapshot 104 and the log table 106. In an embodiment, the journal table 102 is a table of a database with additional metadata (i.e. the log table 106) that indicates how the data in the table has been modified since the last refresh of the table (i.e. since the generation of the latest snapshot 104).

The journal table 102 is a specialized storage mechanism for a table of a database. A traditional database table is stored with no indication of whether the table is stale with respect to DML commands that have been requested on the table. The journal table 102, by contrast, includes the table data (i.e. the snapshot 104) in conjunction with metadata (i.e. the log table 106) that indicates all modifications that have been requested on the table that are not reflected in the snapshot 104.

The snapshot 104 is the data of the table at a certain refresh timestamp. The snapshot 104 is stored in a tabular format including rows, columns, and cells. The snapshot 104 may be stored across multiple micro-partitions. The snapshot 104 may be stored across one or more storage devices of a shared database storage 908 platform. The snapshot 104 includes all data in a table or other storage device at a certain point in time. In various implementations, the snapshot 104 is all data in a table, a micro-partition, an external table, a materialized view, or other storage device at a certain point in time.

The snapshot 104 includes a timestamp indicating the last refresh time of the snapshot 104. In an embodiment, the snapshot 104 includes a ledger indicating each historical refresh of the snapshot 104. Transactions that may cause a snapshot 104 to be refreshed include Data Manipulation Language (DML) commands such as insert, delete, update, and merge commands.

In an embodiment, the snapshot 104 is a table of a database. In an example implementation, the snapshot 104 is refreshed once per week such that all transactions that were requested on the table during the prior week are executed during a single refresh. This is desirable when high-cost transactions such as deletes, updates, and/or merges are requested on the table. Such transactions can consume significant time and computing resources and it may be desirable to implement all transactions during a single refresh of the table. Further, it may be desirable to execute all transactions at an off-peak time when the demand for processing resources is low, for example at nighttime when few users are accessing the database to request queries and other database operations. This can help ensure that sufficient processing resources are available during peak hours to perform database operations with low latency.

In an example implementation, the snapshot 104 is refreshed after a threshold number of transactions have been requested on the table. For example, the snapshot 104 is refreshed only after 10,000 rows of the table have been modified. For example, the snapshot 104 is refreshed only after data in five different columns has been modified. This may be referred to as a threshold level of "staleness" for the data in the snapshot 104. The threshold level of staleness for the snapshot 104 may be manually defined by a client account or administrator and/or may be automatically defined. In an embodiment, the snapshot 104 is automatically refreshed in response to reaching the threshold level of staleness.

In an embodiment, the snapshot 104 is stored across multiple micro-partitions. Such immutable storage devices cannot be updated in-place and must be regenerated each time a transaction is executed. In an example implementation, the table (and therefore the snapshot 104) includes thousands of micro-partitions and each micro-partition includes tens of thousands of rows. When transactions are requested on the table, one or more micro-partitions must be regenerated to reflect the insert, delete, update, and/or merge commands. Regenerating a micro-partition can be extremely costly in terms of time and processing resources. Therefore, it is desirable to perform batch transaction execution such that multiple commands are executed during one regeneration of the table. However, when transactions are not immediately executed on the table (i.e. when the table is not immediately regenerated to reflect the changes), the data in the table is stale and may not return an accurate query result. The journal table 102 disclosed herein that includes both a snapshot 104 and a log table 106 enables query execution 108 to be performed on the journal table 102 that returns accurate results even when the snapshot has not been recently refreshed. The journal table 102 enables query execution 108 to be performed by referencing the snapshot 104 (i.e. the table data itself at a latest refresh timestamp) in conjunction with the log table 106 (i.e. a listing of changes that have been requested on the table since the snapshot 104 was last generated).

The log table 106 includes an indication of transactions that have been requested and/or executed on the table. The log table 106 includes all changes that have occurred at least since the last refresh of the snapshot 104. The journal table 102 may be analogized to a banking ledger, wherein the snapshot 104 is an indication of an end-of-day account balance and the log table 106 is a ledger of all deposits and withdrawals that have occurred on the account since the last end-of-day account balance. The combination of the ledger and the end-of-day account balance can provide the current account balance. Similarly, the combination of the snapshot 104 and the log table 106 can provide the current state of the table.

In an embodiment, the log table 106 is a listing of all transactions that have been ordered and/or executed on the table and when those transactions were ordered and/or executed. The transactions may include Data Manipulation Language (DML) commands such as insert, delete, update, and/or merge commands.

In an embodiment, the log table 106 is a time column in the table that is modeled as a sequence of inserts to the table. When the log table 106 is modeled as a sequence of inserts, the log table 106 only indicates the most recent value for a row or cell in the table. If the row or cell has been modified multiple times since the last refresh of the snapshot 104, the log table only indicates the most recent value for the row or cell. If the row or cell has been deleted since the last refresh of the snapshot 104, the log table 106 includes a record with a flag indicating that the row or cell was deleted.

In an embodiment, the log table 106 includes a change tracking audit summary listing all incremental changes that have been requested on the table since the last refresh of the snapshot 104. In an embodiment, the log table 106 includes a change tracking delta summary listing "total" changes requested on the underlying data source 114 at least since the last refresh of the snapshot 104 without listing incremental changes. For example, the change tracking delta summary may indicate that a certain cell of a micro-partition was ultimately updated from EntryA to EntryF. The certain cell may have been updated from EntryA to EntryB to EntryC and so forth to EntryF, but the change tracking delta indicates only that the cell was updated to EntryF. By contrast, the change tracking audit summary 110 would indicate each of the incremental changes to the cell.

In an embodiment, the log table 106 is metadata associated with the table data in the snapshot 104. The log table 106 may be incorporated in the snapshot 104 as a change tracking column or by some other mechanism. The log table 106 may be stored in a separate metadata micro-partition associated with the snapshot 102. For each micro-partition of a table, the journal table 102 may include a database data micro-partition (the snapshot 104) and may further include a corresponding metadata micro-partition (the log table 106). The combination of the database data micro-partition (the snapshot 104) and the metadata micro-partition (the log table 106) enables a processor to read the database data as of a timestamp by reading the snapshot 104 and further to read any modifications that have been requested on the database data since the timestamp by reading the log table 106. In an embodiment, the snapshot 104 is stored in immutable storage devices that cannot be updated in-place and the log table 106 is stored in mutable storage devices that can be updated in-place.

Query execution 108 on the table is carried out by referencing the snapshot 104 in conjunction with the log table 106, i.e. by referencing the entire journal table 102. In an example implementation, a client account requests a query having multiple predicates. The predicates of the query indicate that the client account wants a summary of, for example, all credit card transactions made in the state of California in the month of May 2019. A resource manager (see 902) references shared metadata (see 912) to determine where the applicable credit card transactions are stored. Based on the metadata 912, the resource manager 902 determines that the applicable credit card transactions are stored in journal table A and specifically stored in micro-partition X of the latest snapshot of journal table A. An execution platform (see 904) receives instructions from the resource manager 902 to process the query by reading data from micro-partition X of journal table A. An execution node of the execution platform 904 reads database data from the snapshot of micro-partition X and further combine that information with information stored in the log table for micro-partition X. The execution node reads the snapshot of micro-partition X to locate all rows comprising data that satisfy the multiple predicates of the query. The execution node reads the log table to determine whether any of those rows have been modified since the last refresh of the snapshot. If any of those rows has been modified since the last refresh of the snapshot, the execution node alters the response to the query to reflect the modifications that are notated in the log table but are not yet reflected in the snapshot. In this implementation, the query response includes only up-to-date data even though the snapshot is stale.

Figure 2:
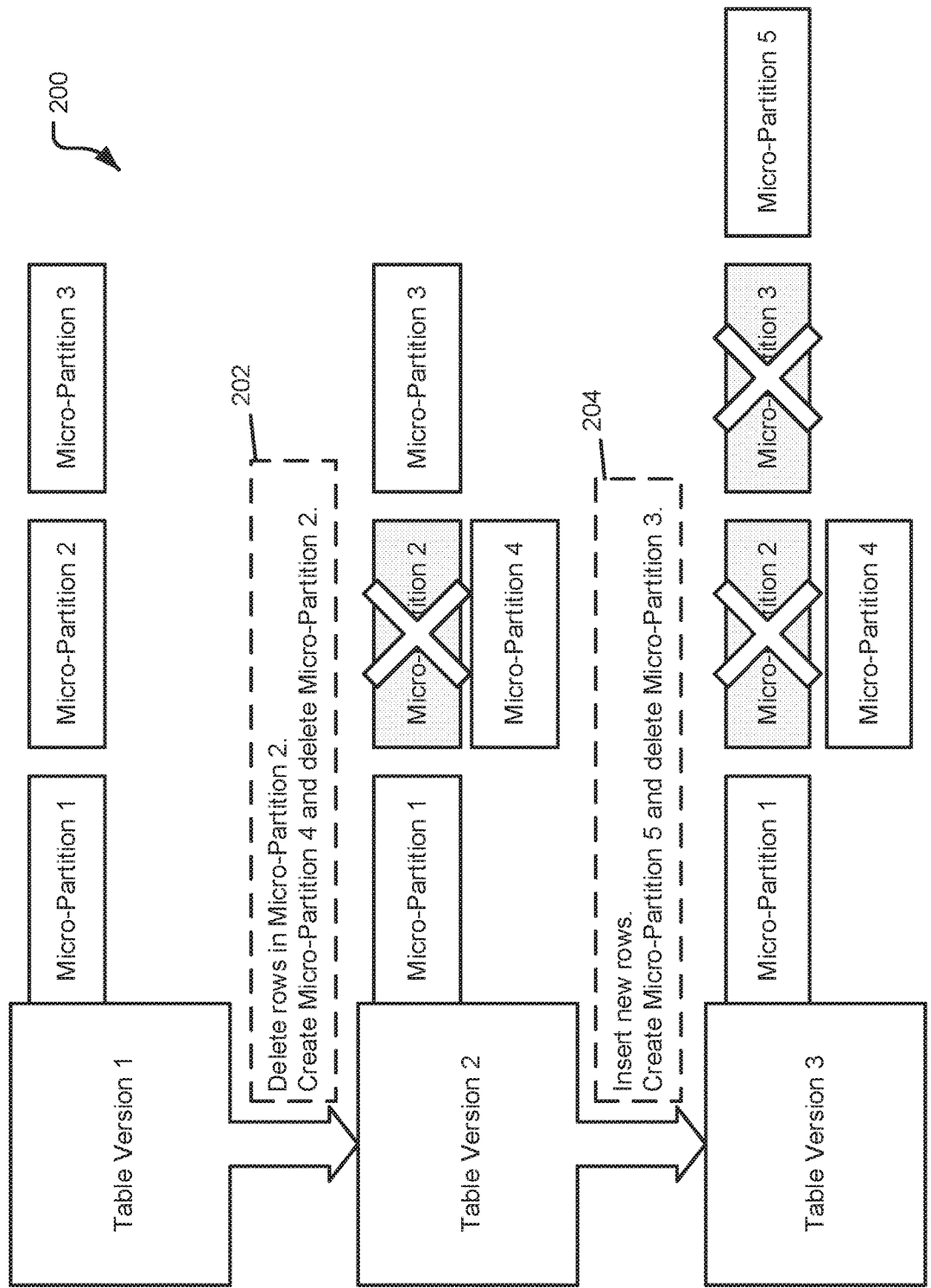
FIG. 2 is a block diagram illustrating modifications made to table versions, according to one embodiment.

FIG. 2 illustrates a schematic block diagram of a table history 200 with multiple table versions. The example table history 200 illustrates three table versions, namely table version 1, table version 2, and table version 3. Table version 1 includes data in the form of three micro-partitions (MPs), namely micro-partition 1 (MP1), micro-partition 2 (MP2), and micro-partition 3 (MP3). A first transaction 202 is executed on table version 1 to generate table version 2. The first transaction 202 includes deleting rows in MP2 to generate a new micro-partition 4 (MP4) and deleting the original MP2. The first transaction 202 executed on table version 1 generates table version 2 which includes the original MP1 and MP3 along with the newly generated MP4. As a result of the first transaction 202, MP2 has been removed from the table as reflected in table version 2. A second transaction 204 is executed on table version 2 to generate table version 3. The second transaction 204 includes inserting new rows such that micro-partition 5 (MP5) is generated and MP3 is removed from the table. Table version 3 includes the original MP1, the MP4 generated as a result of the first transaction 202, and MP5 generated as a result of the second transaction 204. The MP2 was removed as a result of the first transaction 202 and the MP3 was removed from the table as a result of the second transaction 204.

As illustrated in FIG. 2, a database table may store database data in one or more micro-partitions, wherein the micro-partitions constitute immutable storage devices. When a change or modification is executed on the table, the affected micro-partitions are removed, and new micro-partitions are created that reflect the change. In an embodiment, the original unmodified micro-partition is not removed but is also stored with the new micro-partition. The change may include any command that impacts one or more rows in the table, including for example, a delete command, an insert command, an update command, and/or a merge command.

In an embodiment, a snapshot includes the data of table version 1. Before the first transaction 202 is executed, a log table is associated with the snapshot that indicates all changes that have been requested on table version 1 (in this case, the rows that were deleted in MP2). The combination of the snapshot (i.e., table version 1) and the log table (i.e. the listing of requested transactions) enables a processor to determine the data of table version 2 even before table version 2 has been generated. After the first transaction 202 has been executed, a snapshot may be generated for table version 2 and a log table may be generated for the second transaction, and so on.

In an embodiment, a new snapshot is made accessible to a processor only after the new snapshot has been fully generated, i.e. only after the new snapshot reflects all transactions that were requested on the table since the refresh of the last snapshot. Further, a new log table will be associated with the new snapshot only after the new snapshot has been fully generated to reflect the most recent transactions on the table.

Figure 3:
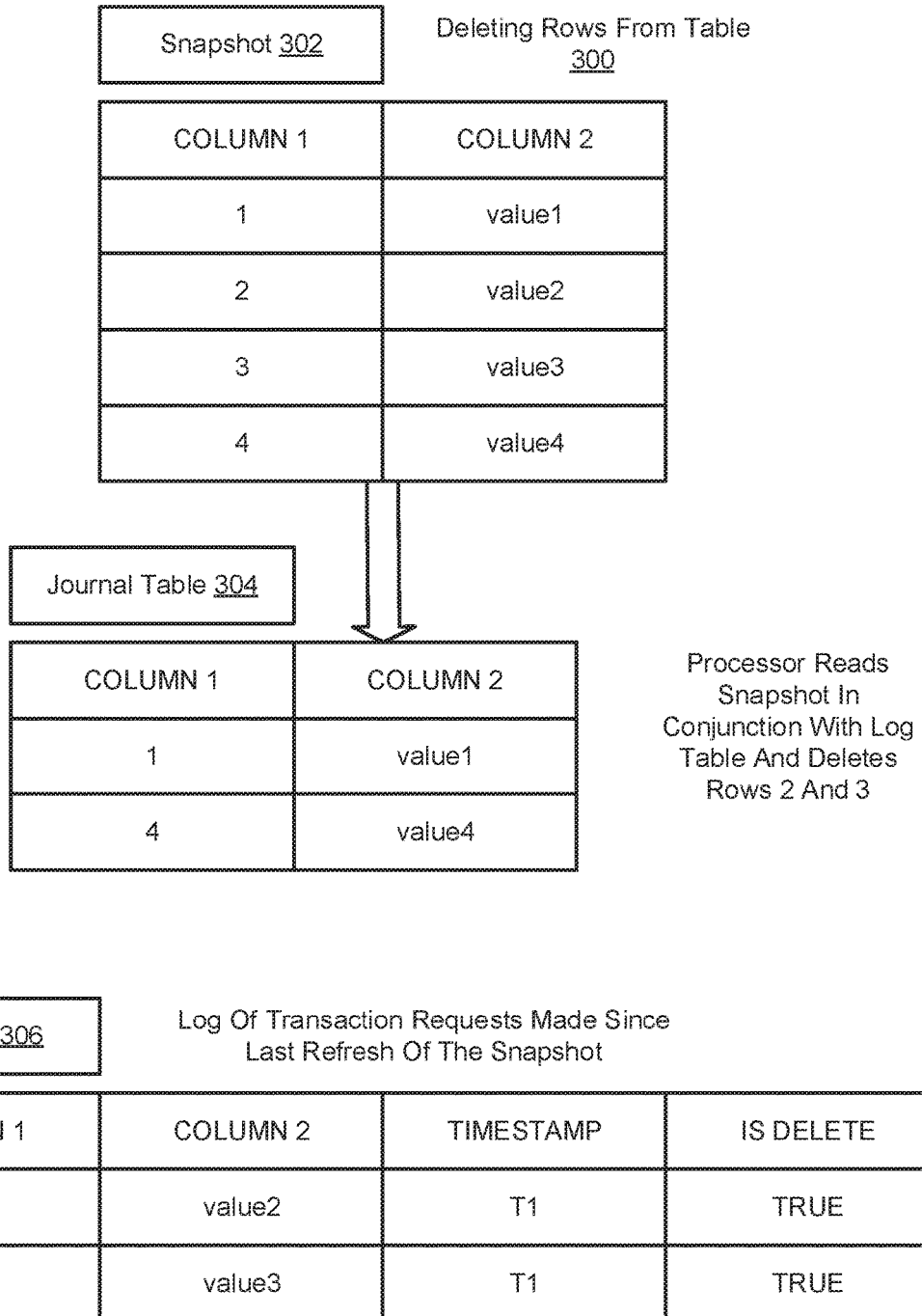
FIG. 3 is a block diagram illustrating a delete command performed on a micro-partition of a database, according to one embodiment.
Figure 4:
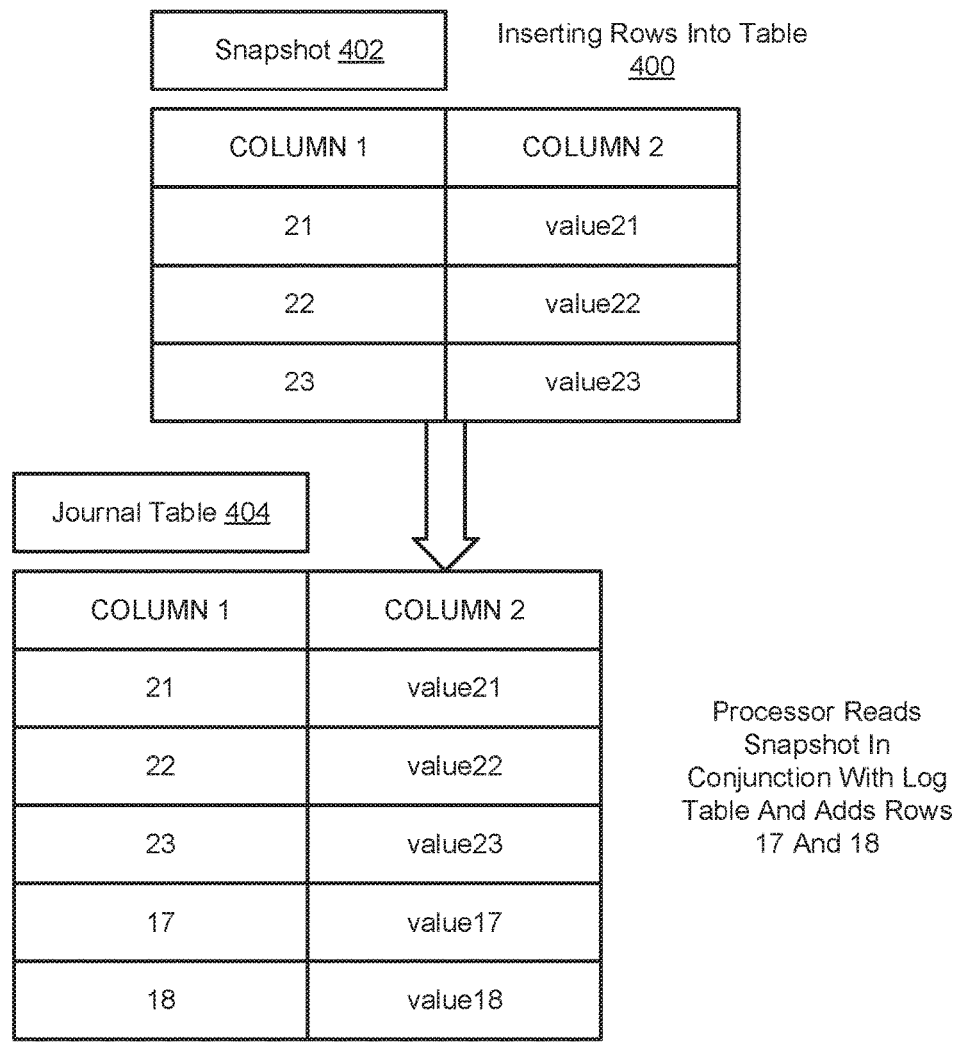
FIG. 4 is a block diagram illustrating an insert command performed on a micro-partition of a database, according to one embodiment.
Figure 5:
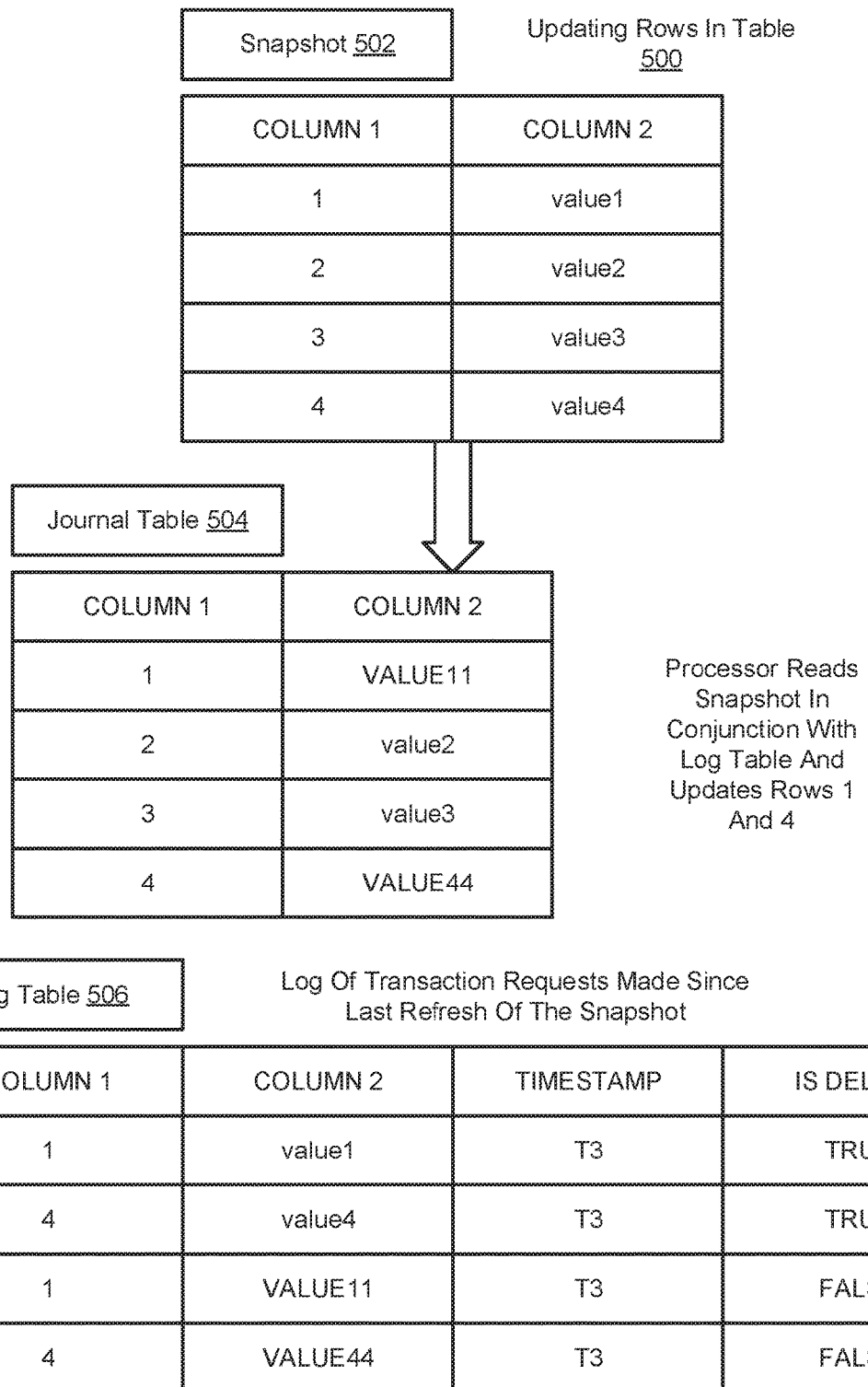
FIG. 5 is a block diagram illustrating an update command performed on a micro-partition of a database, according to one embodiment.

FIGS. 3-5 illustrate exemplary embodiments of delete, insert, and update commands that may be executed on a table. It should be appreciated that the table schemas illustrated in FIGS. 3-5 are illustrative and include simple values to represent rows and columns that may be included in a database table.

FIG. 3 illustrates a block diagram of an example delete command 300 and a resulting log table 306 that may be returned after the delete command 300 is requested but has not been executed. FIG. 3 illustrates a journal table 304 along with its component parts—the snapshot 302 and the log 306. The snapshot 302 indicates the table data as of a most recent refresh timestamp. The journal table 304 represents an up-to-date reflection of the data in the snapshot 302 when read in conjunction with the log table 306. The log table 306 is a representation of all changes that were requested to be made to the snapshot 302 since the most recent refresh of the snapshot 302.

In FIG. 3, the snapshot 302 has four columns. Column 1 includes entries for row numbers that are primarily used for identification purposes. Column 2 includes entries for row values that may include any value depending on the subject or purpose of the database table. [0065] As illustrated in FIG. 3, the delete command 300 is requested on the snapshot 302. The delete command 300 is reflected in the log table 306. When the snapshot 302 is read in conjunction with the log table 306, a processor may determine the journal table 304. The journal table 304 is an accurate and up-to-date reflection of the data in light of the delete command 300.

As an example, as illustrated in FIG. 3, the snapshot 302 includes four rows—namely rows 1, 2, 3, and 4. It should be appreciated that a snapshot may include any number of rows and may often include thousands of rows. The values for each of the rows in the snapshot 302 are listed as value1, value2, value3, and value4 for the four rows by way of example but it should be appreciated the value may include any suitable value as pertinent to the database. The journal table 304 is determined based on the delete command 300 as reflected in the log table 306. The journal table 3040 includes only rows 1 and 4 having values value1 and value4, respectively.

The log table 306 illustrated in FIG. 3 identifies all transactions that have been requested on the snapshot 302. The log table 306 includes four columns, namely a column 1 and column 2 (similar to those shown in the snapshot 302) along with a timestamp column that indicates when the operation occurred and an IS DELETE column that indicates whether the command was a delete command or any other command (may be referred to as an "is_delete" column). Column 1 indicates that rows 2 and 3 have been altered since the last refresh of the snapshot 302. Column 2 indicates that the values of rows 2 and 3 are value2 and value3, respectively. In various embodiments, where the values of rows 2 and 3 may have changed one or more times after the last refresh of the snapshot 302, Column 2 may indicate the most recent value for that row. The timestamp column indicates the transactions occurred at timestamp T1. The IS DELETE column indicates the action was a delete because the IS DELETE column has a "true" metadata notation.

FIG. 4 illustrates a block diagram of an example insert command 400 and a resulting log table 406 that may be generated to indicate that the insert command 400 has not yet been executed on the snapshot 402. In FIG. 4, the snapshot 402 represents the most recent refresh of a micro-partition of a table. The insert command 400 is requested, and the insert command 400 indicates that rows 17 and 18 should be added to the micro-partition. The log table 406 indicates the substance of the insert command 400, i.e. that rows 17 and 18 should be added. The journal table 404 may be determined by a processor based on the snapshot 402 and the log table 406.

In the exemplary implementation in FIG. 4, the insert command 400 inserts rows 17 and 18 into the snapshot 402. As an example, the snapshot 402 includes three rows, namely rows 21, 22, and 23 having values of value21, value22, and value23, respectively. The journal table 404 is determined by combining the snapshot 402 with the information in the log table 406. The journal table 404 (i.e., the combination of the snapshot 402 and the log table 406) includes rows 17 and 18. The values for rows 17 and 18 are value17 and value 18, respectively, because rows 17 and 18 were requested to be inserted by way of the insert command 400 and those are the assigned values for the rows. The values for rows 21, 22, and 23 have not changed.

The log table 406 indicates all transaction requests that have been made since the last refresh of the snapshot 402. The log table 406 indicates that rows 17 and 18 having value17 and value18, respectively, should be added to the snapshot 402. The timestamp indicates that the values for the rows were changed (in this case, added to the table) at timestamp T2. The IS DELETE column indicates that the action was not a delete action but was some other action (in this case, the action was an insert action).

FIG. 5 illustrates a block diagram of an example update command 500 that is requested on a snapshot 502. The resulting journal table 504 may be determined by a processor by reading the snapshot 502 in conjunction with the log table 506.

In the example implementation illustrated in FIG. 5, an update command 500 is requested on the snapshot 502. The update command 500 updates rows 1 and 4 to new values. The snapshot 502 includes rows 1, 2, 3, and 4 having values of value1, value2, value3, and value4, respectively. The journal table 504, as determined by a processor by reading the snapshot 502 in conjunction with the log table 506, includes rows 1, 2, 3, and 4. However, due to the update command 500, row 1 now has a value of VALUE11 and row 4 now has a value of VALUE44.

The log table 506 indicates the substance of the transaction requests that are pending since the last refresh of the snapshot 502. The log table 506 indicates that rows 1 and 4 that had a value of "value1" and "value2", respectively, should be deleted. The log table 506 indicates that rows 1 and 4 that have a value of "VALUE11" and "VALUE44", respectively, should be inserted. The timestamp column indicates that all transactions were requested at timestamp T3. The IS DELETE column indicates that the row 1 having a value "value1" and the row 4 having a value "value4" were deleted. The IS DELETE column indicates that the row 1 having a value "VALUE11" and the row 4 having a value "VALUE44" were not deleted.

In an alternative embodiment, the log table 506 is implemented as a log of inserts even when an update command 500 is requested. When the log table 506 is implemented as a log of inserts, the log table 506 indicates only the most recent value for a row and does not indicate whether the row was inserted or updated.

FIG. 6 is an example log table 600 for a journal table. The log table 600 may be stored as metadata in conjunction with a snapshot. In an embodiment, the snapshot is stored in an immutable storage device that cannot be updated in-place, and the log table 600 is also stored in an immutable storage device that cannot be updated in-place. In an embodiment, the log table 600 and the snapshot are stored in separate immutable storage devices that may be located on the same or different disk storage devices in a shared storage platform. In the example implementation illustrated in FIG. 6, the log table 600 includes four columns, including a time column, a primary key column, a value column, and a comment column.

The time column indicates a timestamp when a transaction request was made on the snapshot. The timestamp for the transaction request may be compared against the timestamp for the latest refresh of the snapshot to determine whether the transaction request has been implemented in the latest refresh of the snapshot. The timestamp may indicate when a transaction request was ordered or received, or it may indicate when that row in the log table 600 was written.

The primary key column is a unique identifier column or set of columns for the row. No two rows in the journal table may share the same primary key values. The primary key value ties the log table 600 to the snapshot such that corresponding rows may be identified in the log table 600 and the snapshot. For example, the snapshot of the journal table includes a row number 325 with a primary key value of K999325. When the value of row number 325 is modified by some transaction, for example the value is updated based on a DML command, then a new row will be written to the log table 600 that includes the same primary key value of K999325. The primary key value may be used to match the row number 325 in the snapshot with the new row that was written to the log table 600. The primary key value is used to identify corresponding or "matching" rows in the snapshot and the log table 600.

The primary key value is used to determine whether a row in the snapshot has any corresponding entries in the log table 600 that indicate how the value of the row has been changed since a last refresh of the snapshot. The entries in the log table 600 are written only when a row in the snapshot has been modified, and therefore the log table 600 does not include a full set of the rows in the snapshot. Instead, the log table 600 includes only a listing of changes that have been made to the rows in the snapshot. The primary key values are used to match rows in the snapshot with corresponding rows in the log table 600.

The value column indicates the most recent value for that row. In the example illustrated in FIG. 6, a row having a primary key value of K1 was inserted into the journal table at timestamp T1 with a value of V11. The same row having a primary key value of K1 was updated at timestamp T3 to have an updated value of V12. The same row having a primary key value of K1 was updated at timestamp T4 to have a value of V13. Further, a row having a primary key value of K2 was inserted into the journal table at timestamp T2 with a value of V21. The same row having the primary key value of K2 was updated at timestamp T6 to have a value of V22. Further, a row having a primary key value of K3 was inserted into the journal table at timestamp T5 with a value of V31. In the case of rows that have been modified multiple times, the most recent modification, i.e. the modification with the latest timestamp value, will be used. For example, in the case of the row having a primary key value of K, the value of V13 will be used because that value is associated with the most recent timestamp T4. Further for example, in the case of the row having a primary key value of K2, the value of V22 will be used because that value is associated with the most recent timestamp T6 for that particular primary key.

The comment column provides an indication of what type of transaction request was made that altered the value for that row. In the example implementation shown in FIG. 6, the comment column may indicate that an insert command or an update command caused the value of the row to change. The comment column may further indicate whether a row was deleted. In an embodiment, the log table 600 includes an IS DELETE column that indicates whether the row was deleted or not.

Figure 7:
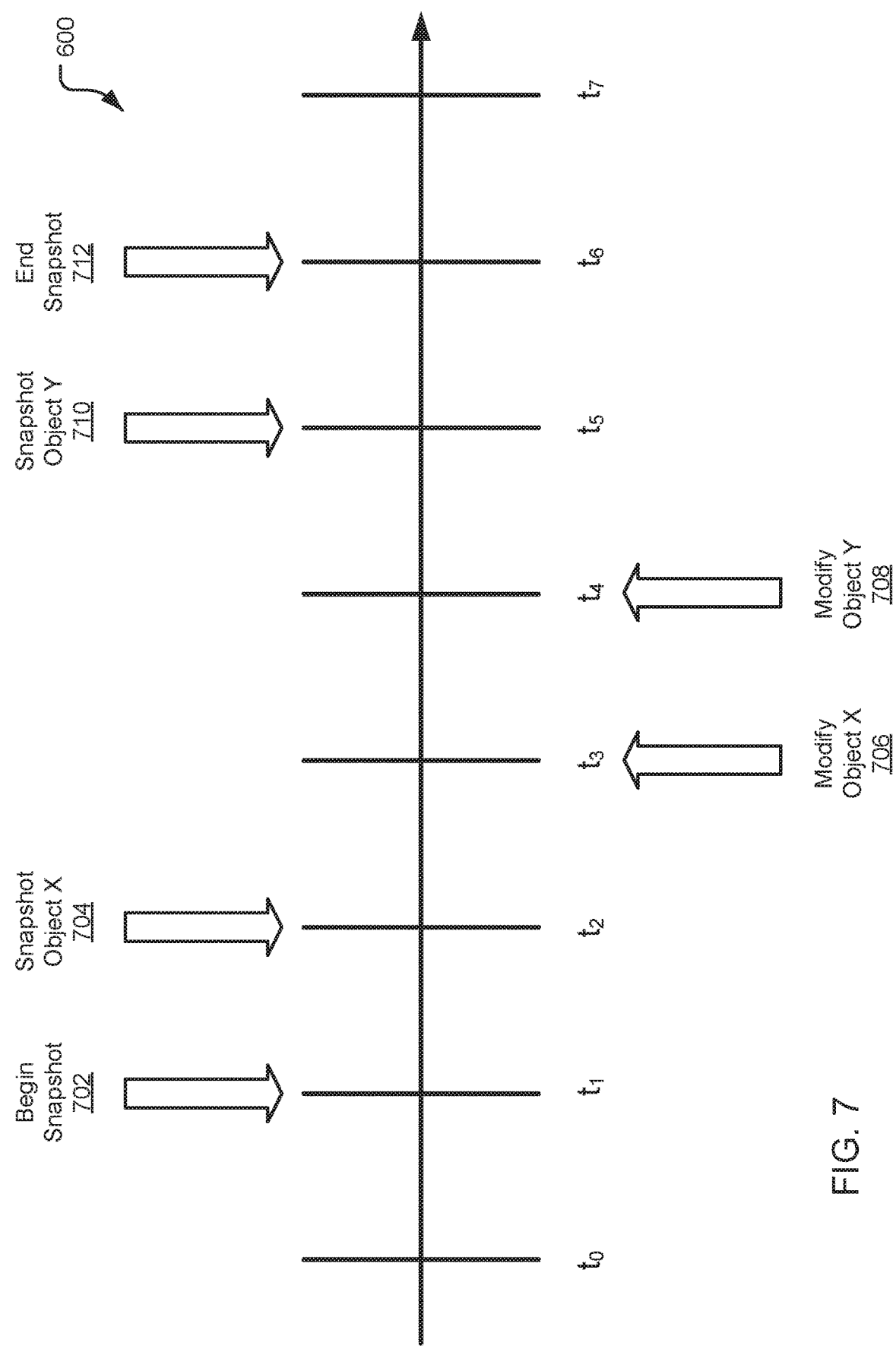
FIG. 7 is a schematic diagram of a process flow for generating a snapshot of a table, according to one embodiment.

FIG. 7 is a schematic diagram illustrating a process flow 700 for generating a database snapshot. The snapshot captures one or more objects of the database, for example the structure of the database (e.g., schemas, tables, views, etc.) and/or the contents of the database (i.e., rows). In certain embodiments, the conceptually cleanest approach occurs where the snapshot reflects a transactionally consistent view of the database at a specific point in time.

The process flow 700 illustrates a timeline depicting a snapshot that is initiated at time $t_1$ and completes at time $t_6$. The process flow 700 begins and a snapshot is initiated at 702. A snapshot of object X is generated at 704 at time $t_2$ and the snapshot of object Y is generated at 710 at time $t_5$. As illustrated, object X is modified at 706 at time $t_3$ and object Y is modified at 708 at time $t_4$. Object X is modified at 706 after the snapshot of object X is generated at 704. Object Y is modified at 708 before the snapshot of object Y is generated at 710. The snapshot ends at 712. The metadata of the journal table and/or the snapshot indicates the latest complete version of the snapshot. If the snapshot refresh is in progress, a resource manager will point to the older complete version. If a snapshot refresh is in progress, transactions and queries will continue to be applied against the log table and the older complete version of the snapshot.

In an embodiment, a log table record ensures the log records themselves include enough information to correctly and unambiguously reproduce the transaction changes since the last refresh of the snapshot. This may be satisfied because changes applied by the log table are known at commit time and the method may include capturing and serializing the metadata changes made by the transaction.

Figure 8:
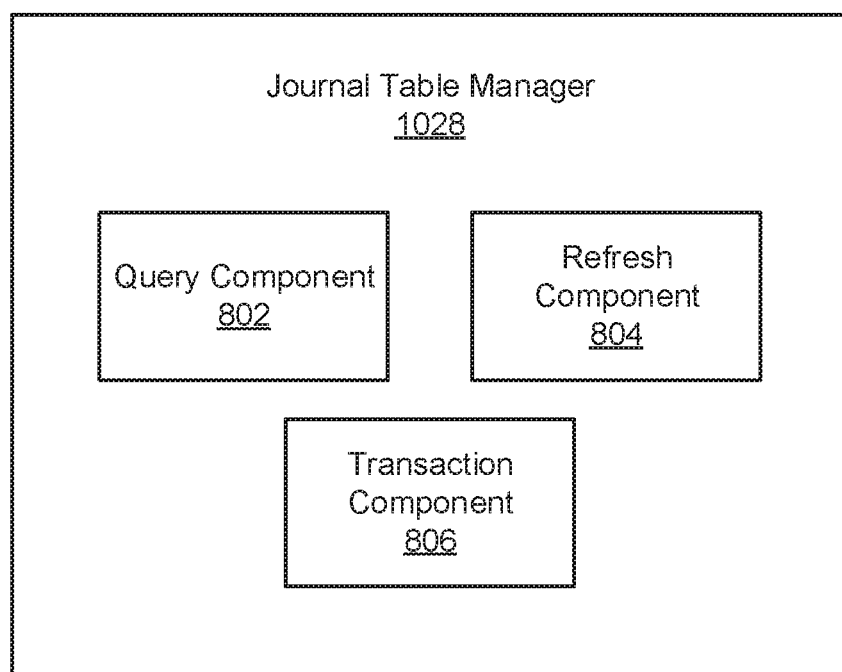
FIG. 8 is a block diagram of a journal table manager, according to one embodiment.

FIG. 8 is a schematic block diagram illustrating components of a journal table manager 1028, according to one embodiment. The journal table manager 1028 may generate and refresh journal table snapshots and log tables. The journal table manager 1028 includes a query component 802, a refresh component 804, and a transaction component 806. The query component 802 merges results from a snapshot and a log table to determine an up-to-date version of the journal table. The refresh component 804 generates new snapshots based on a log table. The transaction component 806 directs all changes made to the table to the log table such that the change is memorialized in the log table in lieu of being executed on the snapshot.

The query component 802 is configured to execute a query by reading data in a journal table that includes a snapshot and a log table. The query component 802 reads the rows from the snapshot and the log table. If there are any conflicts between the snapshot and the log table, i.e. two rows with the same primary key, the row from the log table will take precedence and be used for responding to the query. If there are multiple rows in the log table with the same primary key, then the later row, i.e. the rows with the higher operation time or later timestamp will take precedence and be used for responding to the query. In this way, the primary key is used as a guarantee for the journal table such that a user never sees more than one row with a given primary key.

The transaction component 806 inserts new rows into the log table in lieu of executing transactions on the snapshot of the journal table. Various transactions may be requested on the journal table, such as insert, delete, update, or merge commands. The transaction component 806 inserts new rows into the log table that indicate any changes made by the transactions. Each of rows in the log table is an indication of a change made to one row of the snapshot. For example, one row in the log table may indicate that the value of a certain row the snapshot was modified. For example, one row in the log table may indicate that a certain row of the snapshot was deleted.

The refresh component 804 ensures that the size of the log table remains relatively small such that the size of the log table does not impact query performance. When a query is executed on the journal table, a processor must read the snapshot and the log table and determine whether there are any duplicates in the snapshot and the log table. If there is a duplicate row between the snapshot and the log table (as determined based on the primary key), then the processor must find the latest version for that row. This process is increasingly expensive as the size of the log table rows. Therefore, the refresh component 804 periodically updates the snapshot and truncates the log table. For each row in the log table, if there is a corresponding row in the snapshot with the same primary key, then the corresponding row will be modified in accordance with the information in the log table. If the log table indicates that the corresponding row was deleted by a transaction, then the corresponding row will be removed from the snapshot. If the log table indicates that the value of the corresponding row was modified one or more times by transactions, then the corresponding row will be updated to the latest value as indicated by the log table. If there is a new row in the log table with a primary key that is not present in the snapshot, then the value of the new row will be copied over as a new row in the snapshot. After all rows in the log table have been processed, the log table can be truncated. The log table may be truncated by marking the snapshot with the operation time when the last row was modified/refreshed in accordance with the log table. For subsequent queries, this operation time will be referenced and only new rows in the log table that were written after that operation time will be read.

Figure 9:
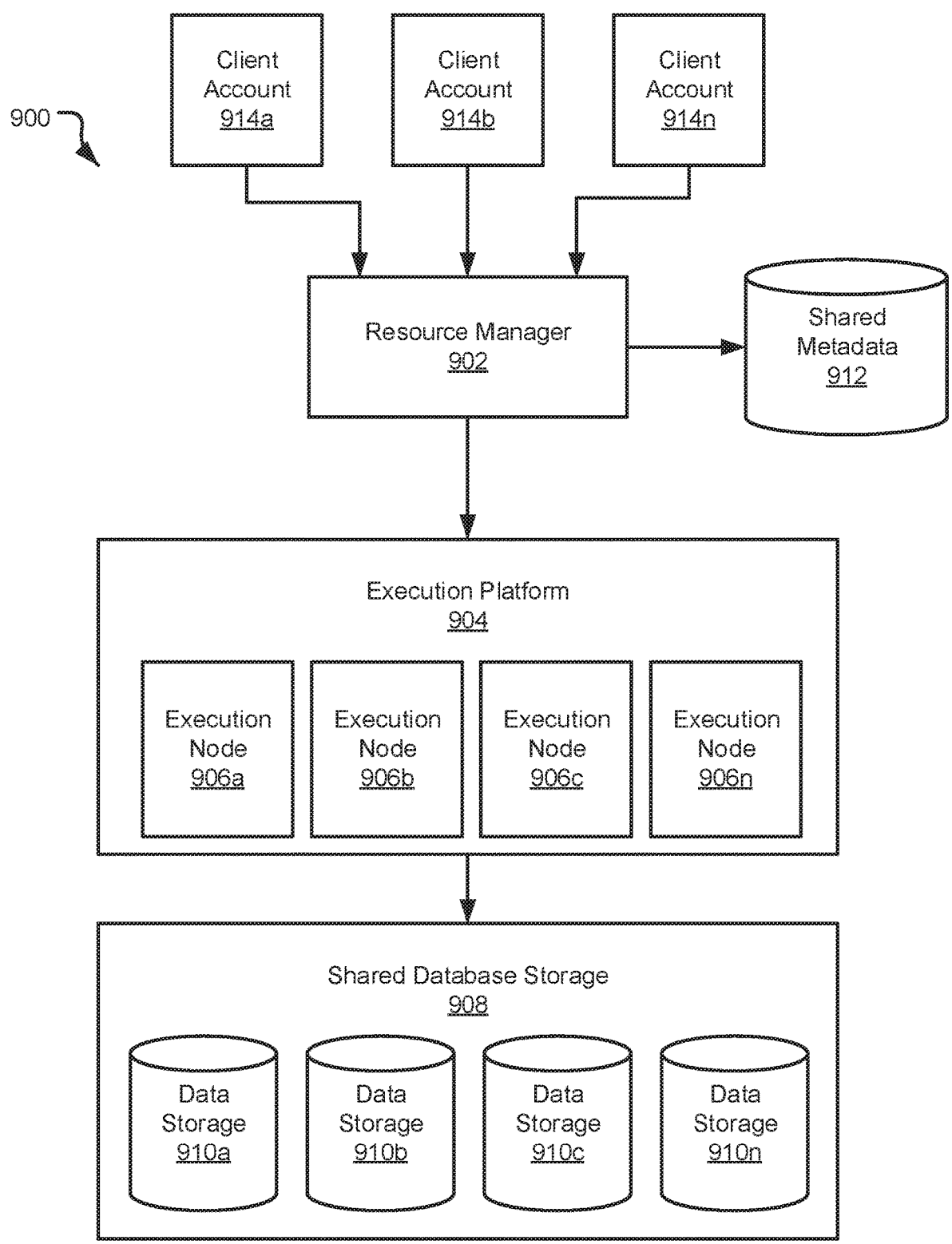
FIG. 9 is a schematic block diagram of a database platform, according to one embodiment.

Referring now to FIG. 9, a data processing platform 900 is illustrated for running the methods and systems disclosed herein. As shown in FIG. 9, resource manager 902 may be coupled to multiple client accounts 914a, 914b, and 914n. The client accounts 914a, 914b, and 914n may represent different clients. In particular implementations, the resource manager 902 can support any number of client accounts desiring access to the execution platform 904 and/or or shared database storage 908. Client accounts 914a, 914b, and 914n may include, for example, end users providing user files to be ingested into the database, data storage and retrieval requests, system administrators managing the systems and methods described herein, and other components/devices that interact with resource manager 902.

The resource manager 902 provides various services and functions that support the operation of all systems and components within the data processing platform 900. The resource manager 902 may be coupled to shared metadata 912, which is associated with the entirety of data stored throughout data processing platform 900. The shared metadata 912 includes metadata for data stored in the shared database storage 908 and further includes metadata for data stored in external tables (see 106). In some embodiments, shared metadata 912 includes a summary of data stored in remote data storage systems as well as data available from a local cache. Additionally, shared metadata 912 may include information regarding how data is organized in the remote data storage systems and the local caches. Shared metadata 912 may allow systems and services to determine whether a piece of data needs to be processed without loading or accessing the actual data from a storage device.

The resource manager 902 may be further coupled to the execution platform 904, which provides multiple computing resources that execute various data storage and data retrieval tasks, as discussed in greater detail below. The execution platform 904 includes a plurality of execution nodes 906a, 906b, 906c, and 906n configured to process various tasks associated with the database, including ingesting new user files and generating one or more micro-partitions for a table (may be an external table or a table stored in the shared database storage 908) based on the new user files. The execution platform 904 may be coupled to the shared database storage 908 including multiple data storage devices 910a, 910b, 910c, and 910n. In some embodiments, the shared database storage 908 includes cloud-based storage devices located in one or more geographic locations. For example, the shared database storage 908 may be part of a public cloud infrastructure or a private cloud infrastructure. The shared database storage 908 may include hard disk drives (HDDs), solid state drives (SSDs), storage clusters or any other data storage technology. Additionally, shared database storage 908 may include distributed file systems (such as Hadoop Distributed File Systems (HDFS)), object storage systems, and the like. It should be appreciated that the shared database storage 908 may be accessible by one or more instances of the resource manager 902 but may not be accessible by all client accounts 914a-914n. In an embodiment, a single instance of the resource manager 902 is shared by a plurality of client accounts 914a-914n. In an embodiment, each client account 914a-914n has its own resource manager and/or its own shared database storage 908 that is shared amongst a plurality of execution nodes 906a-906n of the execution platform 904. In an embodiment, the resource manager 902 is responsible for providing a particular client account 914a-914n access to particular data within the shared database storage 908.

In particular embodiments, the communication links between the resource manager 902 and client accounts 914a-914n, shared metadata 912, and execution platform 904 are implemented via one or more data communication networks. Similarly, the communication links between execution platform 904 and shared database storage 908 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 9, data storage devices 910a-910n are decoupled from the computing resources associated with execution platform 904. This architecture supports dynamic changes to data processing platform 900 based on the changing data storage/retrieval needs as well as the changing needs of the users and systems accessing data processing platform 900. This architecture enables the execution platform 904 and the shared database storage 908 to be effectively infinitely scalable. The support of dynamic changes allows the data processing platform 900 to scale quickly in response to changing demands on the systems and components within data processing platform 900. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The resource manager 902, shared metadata 912, execution platform 904, and shared database storage 908 are shown in FIG. 9 as individual components. However, each of the resource manager 902, the shared metadata 912, the execution platform 904, and the shared database storage 908 may be implemented as a distributed system (e.g., distributed across multiple systems/platforms at multiple geographic locations). Additionally, each of resource manager 902, shared metadata 912, execution platform 904, and shared database storage 908 can be scaled up or down (independently of one another) depending on changes to the requests received from client accounts 914a-914n and the changing needs of data processing platform 900. Thus, data processing platform 900 is dynamic and supports regular changes to meet the current data processing needs.

Figure 10:
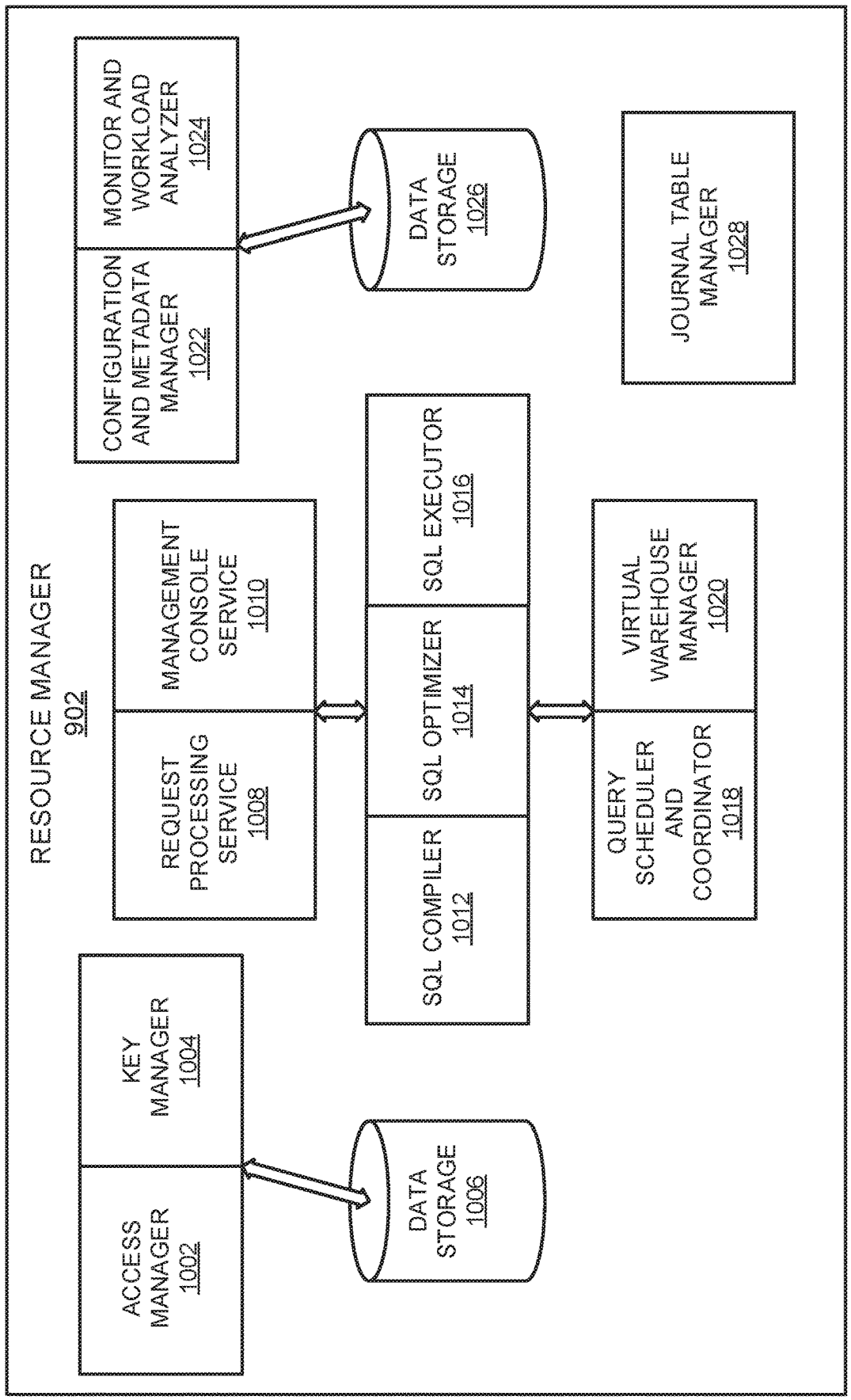
FIG. 10 is a block diagram illustrating components of a resource manager, according to one embodiment.

FIG. 10 is a block diagram depicting an embodiment of resource manager 902. As shown in FIG. 10, resource manager 902 includes an access manager 1002 and a key manager 1004 coupled to a data storage device 1006. Access manager 1002 may handle authentication and authorization tasks for the systems described herein. Key manager 1004 may manage storage and authentication of keys used during authentication and authorization tasks. A request processing service 1008 manages received data storage requests and data retrieval requests. A management console service 1010 supports access to various systems and processes by administrators and other system managers.

The resource manager 902 may also include a job compiler 1012, a job optimizer 1014 and a job executor 1016. Job compiler 1012 parses tasks, such as ingest tasks, and generates the execution code for the ingestion of user files. Job optimizer 1014 determines the best method to execute ingest tasks based on the data that needs to be processed and/or ingested. Job executor 1016 executes code for ingest tasks received by resource manager 902. A job scheduler and coordinator 1018 may send received user files to the appropriate services or systems for compilation, optimization, and dispatch to the execution platform 904. A virtual warehouse manager 1020 manages the operation of multiple virtual warehouses implemented in an execution platform.

Additionally, the resource manager 902 includes a configuration and metadata manager 1022, which manages the information related to the data stored in the remote data storage devices and in the local caches. A monitor and workload analyzer 1024 oversees the processes performed by resource manager 902 and manages the distribution of tasks (e.g., workload) across the virtual warehouses and execution nodes in the execution platform. Configuration and metadata manager 1022 and monitor and workload analyzer 1024 are coupled to a data storage device 1026.

The resource manager 902 includes a journal table manager 1028. The journal table manager 1028 generates, manages, and oversees journal tables that include a snapshot and a log table for a table.

Figure 11:
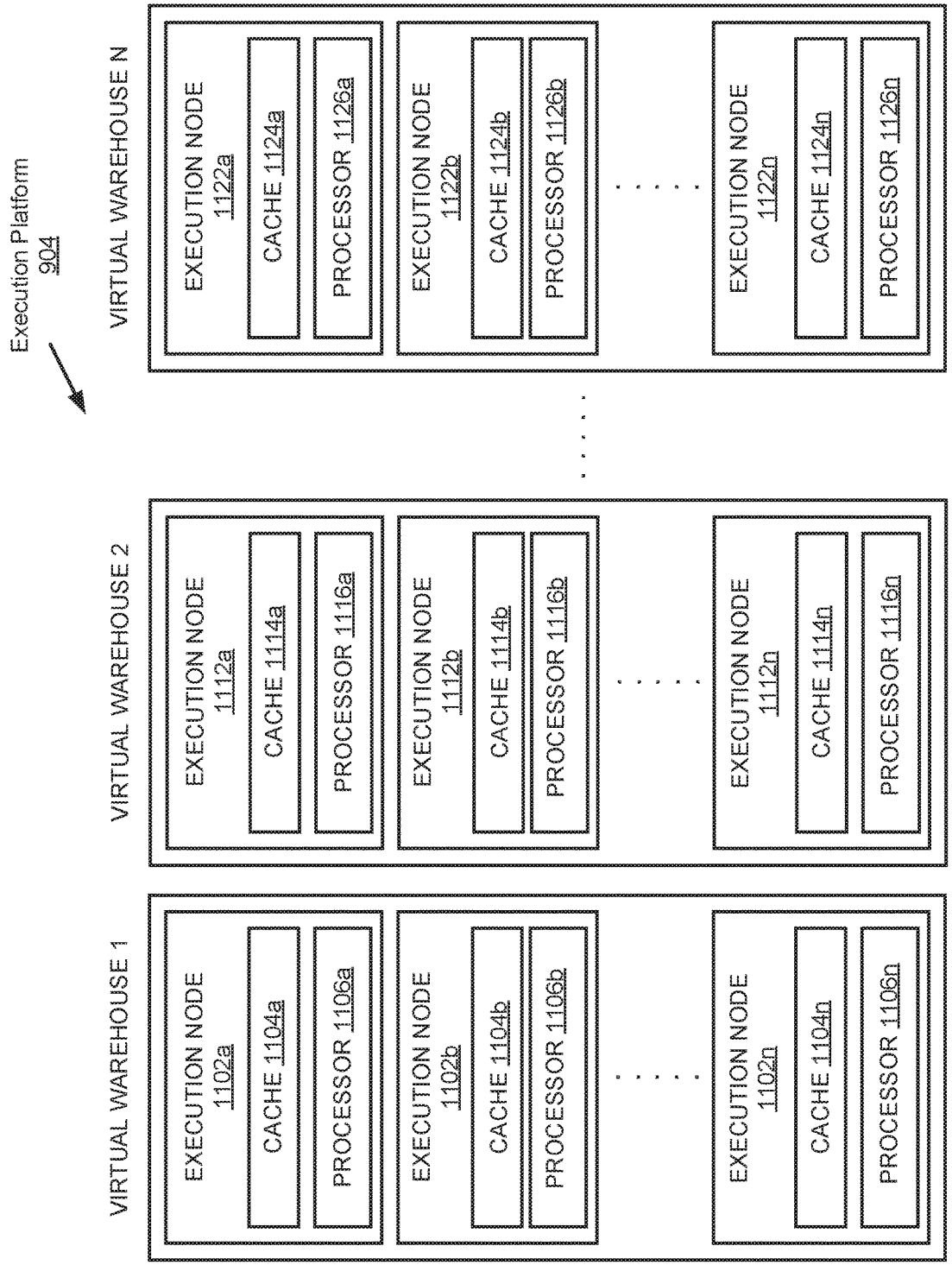
FIG. 11 is a block diagram of an execution platform, according to one embodiment.

FIG. 11 is a block diagram depicting an embodiment of an execution platform 904. As shown in FIG. 11, execution platform 904 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, execution platform 904 can add new virtual warehouses and drop existing virtual warehouses in real-time based on the current processing needs of the systems and users. This flexibility allows the execution platform 904 to quickly deploy large amounts of computing resources when needed without being forced to continue paying for those computing resources when they are no longer needed. All virtual warehouses can access data from any data storage device (e.g., any storage device in shared database storage 908). Although each virtual warehouse shown in FIG. 11 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 910a-910n shown in FIG. 9. Thus, the virtual warehouses are not necessarily assigned to a specific data storage device and, instead, can access data from any of the data storage devices 910a-910n within the shared database storage 908. Similarly, each of the execution nodes shown in FIG. 11 can access data from any of the data storage devices 910a-910n. In some embodiments, a particular virtual warehouse or a particular execution node may be temporarily assigned to a specific data storage device, but the virtual warehouse or execution node may later access data from any other data storage device.

In the example of FIG. 11, virtual warehouse 1 includes three execution nodes 1102a, 1102b, and 1102n. Execution node 1102a includes a cache 1104b and a processor 1106a. Execution node 1102b includes a cache 1104b and a processor 1106b. Execution node 1102n includes a cache 1104n and a processor 1106n. Each execution node 1102a, 1102b, and 1102n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 1108a, 1108b, and 1108n. Execution node 1108a includes a cache 1114a and a processor 1116a. Execution node 1108b includes a cache 1114b and a processor 1116b. Execution node 1108n includes a cache 1114n and a processor 1116n. Additionally, virtual warehouse 3 includes three execution nodes 1082a, 1082b, and 1082n. Execution node 1082a includes a cache 1084a and a processor 1086a. Execution node 1082b includes a cache 1084b and a processor 1086b. Execution node 1082n includes a cache 1084n and a processor 1086n.

In some embodiments, the execution nodes shown in FIG. 11 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 11 each include one data cache and one processor, alternate embodiments may include execution nodes containing any number of processors and any number of caches. Additionally, the caches may vary in size among the different execution nodes. The caches shown in FIG. 11 store, in the local execution node, data that was retrieved from one or more data storage devices in the shared database storage 908. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the shared database storage 908.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 904, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 11 as having multiple execution nodes. The multiple execution nodes associated with each virtual warehouse may be implemented using multiple computing systems at multiple geographic locations. For example, an instance of virtual warehouse 1 implements execution nodes 1102a and 1102b on one computing platform at a geographic location and implements execution node 1102n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 904 is also fault tolerant. For example, if one virtual warehouse fails, that virtual warehouse is quickly replaced with a different virtual warehouse at a different geographic location.

A particular execution platform 904 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the shared database storage 908 but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

The execution platform 904 may execute queries against an external table, where the external table is not managed by the database platform but can be read by the database platform. The execution platform 904 may execute such queries by communicating with the external table and reading data directly from the external table.

FIG. 12 is a schematic flow chart diagram illustrating an example method 1200 for executing a query on data that is stale with respect to one or more transaction requests. The method 1200 may be performed by a journal table manager 1028, resource manager 902, data processing platform 900, execution platform 904, or any other suitable computing device.

The method 1200 begins and a computing device defines at 1202 a journal table including a snapshot and a log table. The snapshot comprises an up-to-date representation of data in the journal table at a point in time. The computing devices assigns at 1204 a timestamp to the snapshot indicating when the snapshot was generated. The computing device receives at 1206 a request to execute a transaction on the journal table to modify the data in the journal table. The transaction includes one or more of an insert command, a delete command, an update command, or a merge command. The transaction may impact one or more rows in the journal table. The computing device inserts at 1208 a new row into the log table in lieu of executing the transaction on the snapshot of the journal table. The new row includes an indication of a change requested to be made to the journal table based on the transaction. For example, the new row indicates that a certain row in the snapshot was deleted or updated. For example, the new row indicates that an additional row has been added to the journal table that is not yet reflected in the snapshot.

Figure 13:
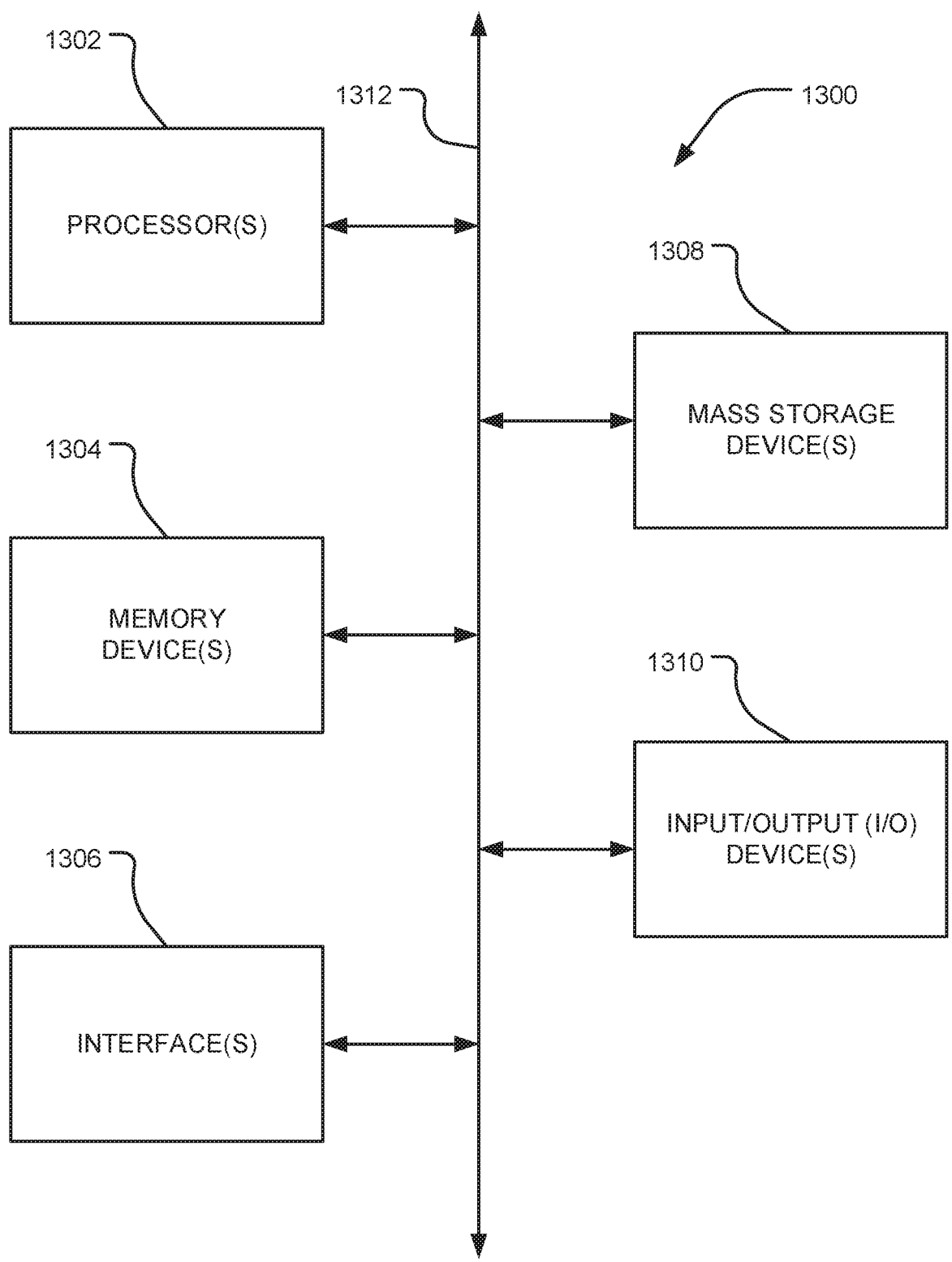
FIG. 13 is a block diagram depicting an example computing device consistent with at least one embodiment of processes and systems disclosed herein.

FIG. 13 is a block diagram depicting an example computing device 1300. In some embodiments, computing device 1300 is used to implement one or more of the systems and components discussed herein. For example, computing device 1300 may include or be part of a change tracking manager 628, a database service manager 502, a processing platform 500, and/or any other components or systems discussed herein. As another example, the components, systems, or platforms discussed herein may include one or more computing devices 1000. Further, computing device 1300 may interact with any of the systems and components described herein. Accordingly, computing device 1300 may be used to perform various procedures and tasks, such as those discussed herein. Computing device 1300 can function as a server, a client or any other computing entity. Computing device 1300 can be any of a wide variety of computing devices, such as a desktop computer, a notebook computer, a server computer, a handheld computer, a tablet, and the like.

Computing device 1300 includes one or more processor(s) 1306, one or more memory device(s) 1304, one or more interface(s) 1306, one or more mass storage device(s) 1308, and one or more Input/Output (I/O) device(s) 1310, all of which are coupled to a bus 1312. Processor(s) 1306 include one or more processors or controllers that execute instructions stored in memory device(s) 1304 and/or mass storage device(s) 1308. Processor(s) 1306 may also include various types of computer-readable media, such as cache memory.

Memory device(s) 1304 include various computer-readable media, such as volatile memory (e.g., random access memory (RAM)) and/or nonvolatile memory (e.g., read-only memory (ROM)). Memory device(s) 1304 may also include rewritable ROM, such as Flash memory.

Mass storage device(s) 1308 include various computer readable media, such as magnetic tapes, magnetic disks, optical disks, solid state memory (e.g., Flash memory), and so forth. Various drives may also be included in mass storage device(s) 1308 to enable reading from and/or writing to the various computer readable media. Mass storage device(s) 1308 include removable media and/or non-removable media.

I/O device(s) 1310 include various devices that allow data and/or other information to be input to or retrieved from computing device 1300. Example I/O device(s) 1310 include cursor control devices, keyboards, keypads, microphones, monitors or other display devices, speakers, printers, network interface cards, modems, lenses, CCDs or other image capture devices, and the like.

Interface(s) 1306 include various interfaces that allow computing device 1300 to interact with other systems, devices, or computing environments. Example interface(s) 1306 include any number of different network interfaces, such as interfaces to local area networks (LANs), wide area networks (WANs), wireless networks, and the Internet.

Bus 1312 allows processor(s) 1306, memory device(s) 1304, interface(s) 1306, mass storage device(s) 1308, and I/O device(s) 1310 to communicate with one another, as well as other devices or components coupled to bus 1312. Bus 1312 represents one or more of several types of bus structures, such as a system bus, PCI bus, USB bus, and so forth.

The flow diagrams and block diagrams herein illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein provide a flexible and scalable data warehouse using new data processing platforms, methods, systems, and algorithms. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database using any data storage architecture and using any language to store and retrieve data within the database. The systems and methods described herein may also provide a multi-tenant system that supports isolation of computing resources and data between different customers/clients and between different users within the same customer/client.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A method comprising:
receiving one or more requests to execute one or more requested transactions on a journal table of a database, the journal table comprising a snapshot and a log table, the snapshot stored in a first micro-partition, the log table stored in a second micro-partition;
based on the one or more requests, inserting a new row into the log table for each requested transaction, each new row reflecting a corresponding requested transaction;
receiving, after the one or more requested transactions have been executed, a second request to execute a second requested transaction on the journal table; and
generating, prior to executing the second requested transaction, a second snapshot, the second snapshot comprising a second representation of data in the journal table after the one or more requested transactions have been executed, the second snapshot stored in a third micro-partition different than the first micro-partition and the second micro-partition.

2. The method of claim 1, wherein the snapshot comprises a representation of data in the journal table at a point in time, the log table comprises a listing of requested changes to the journal table since the point in time.

3. The method of claim 1, further comprising:
receiving a query; and
generating a response to the query based on the snapshot as modified by the log table.

4. The method of claim 3, wherein generating the response to the query comprises:
generating a query task comprising instructions to read the snapshot and the log table to respond to the query; and
assigning the query task to at least one execution node of an execution platform.

5. The method of claim 3, wherein generating the response to the query comprises:
identifying data in the snapshot that is responsive to the query; and
based on determining that the identified data has been modified by one or more rows in the log table, reflecting the one or more rows in the response to the query.

6. The method of claim 5, further comprising:
identifying a primary key for a row of the snapshot that is responsive to the query;
scanning the log table to determine whether one or more rows in the log table comprise the identified primary key; and
in response to identifying one or more rows in the log table that comprise the primary key, determining that the identified data has been modified by one or more rows in the log table.

7. The method of claim 1, further comprising:
inserting, in a timestamp column in the new row, a timestamp that corresponds to the requested transaction;
inserting, in a primary key column in the new row, a primary key of a corresponding row in the snapshot; and
inserting, in a transaction-type column in the new row, a type of the requested transaction.

8. The method of claim 1, further comprising:
prior to receiving the one or more requests, assigning a primary key to a row in the snapshot; and
assigning the primary key to a corresponding row in the log table such that corresponding rows in the snapshot and the log table comprise an identical unique primary key.

9. The method of claim 1, wherein the snapshot is stored across a plurality of micro-partitions.

10. The method of claim 1, wherein the first micro-partition and the second micro-partition cannot be updated in-place and further comprising:
storing a second log table in a fourth micro-partition, the fourth micro-partition being different than the third micro-partition, wherein the third micro-partition and the fourth micro-partition cannot be updated in-place;
deleting the third micro-partition after the second log table has been stored in the fourth micro-partition; and
deleting the first micro-partition after the second snapshot has been stored in the third micro-partition.

11. A system comprising:
at least one processor; and
one or more non-transitory computer readable storage media containing instructions executable by the at least one processor for causing the at least one processor to perform operations comprising:
receiving one or more requests to execute one or more requested transactions on a journal table of a database, the journal table comprising a snapshot and a log table, the snapshot stored in a first micro-partition, the log table stored in a second micro-partition;
based on the one or more requests, inserting a new row into the log table for each requested transaction, each new row reflecting a corresponding requested transaction;
receiving, after the one or more requested transactions have been executed, a second request to execute a second requested transaction on the journal table; and
generating, prior to executing the second requested transaction, a second snapshot, the second snapshot comprising a second representation of data in the journal table after the one or more requested transactions have been executed, the second snapshot stored in a third micro-partition different than the first micro-partition and the second micro-partition.

12. The system of claim 11, wherein the snapshot comprises a representation of data in the journal table at a point in time, the log table comprises a listing of requested changes to the journal table since the point in time.

13. The system of claim 11, further comprising:
receiving a query; and
generating a response to the query based on the snapshot as modified by the log table.

14. The system of claim 13, wherein generating the response to the query comprises:
generating a query task comprising instructions to read the snapshot and the log table to respond to the query; and assigning the query task to at least one execution node of an execution platform.

15. The system of claim 13, wherein generating the response to the query comprises:
   identifying data in the snapshot that is responsive to the query; and
   based on determining that the identified data has been modified by one or more rows in the log table, reflecting the one or more rows in the response to the query.

16. The system of claim 15, further comprising:
   identifying a primary key for a row of the snapshot that is responsive to the query;
   scanning the log table to determine whether one or more rows in the log table comprise the identified primary key; and
   in response to identifying one or more rows in the log table that comprise the primary key, determining that the identified data has been modified by one or more rows in the log table.

17. The system of claim 11, further comprising:
   inserting, in a timestamp column in the new row, a timestamp that corresponds to the requested transaction;
   inserting, in a primary key column in the new row, a primary key of a corresponding row in the snapshot; and
   inserting, in a transaction-type column in the new row, a type of the requested transaction.

18. The system of claim 11, further comprising:
   prior to receiving the one or more requests, assigning a primary key to a row in the snapshot; and
   assigning the primary key to a corresponding row in the log table such that corresponding rows in the snapshot and the log table comprise an identical unique primary key.

19. The system of claim 11, wherein the snapshot is stored across a plurality of micro-partitions.

20. The system of claim 11, wherein the first micro-partition and the second micro-partition cannot be updated in-place and the operations further comprise:
   storing a second log table in a fourth micro-partition, the fourth micro-partition being different than the third micro-partition, wherein the third micro-partition and the fourth micro-partition cannot be updated in-place;
   deleting the third micro-partition after the second log table has been stored in the fourth micro-partition; and
   deleting the first micro-partition after the second snapshot has been stored in the third micro-partition.

21. A non-transitory computer readable storage media containing instructions executable by at least one processor for causing the at least one processor to perform operations comprising:
   receiving one or more requests to execute one or more requested transactions on a journal table of a database, the journal table comprising a snapshot and a log table, the snapshot stored in a first micro-partition, the log table stored in a second micro-partition;
   based on the one or more requests, inserting a new row into the log table for each requested transaction, each new row reflecting a corresponding requested transaction;
   receiving, after the one or more requested transactions have been executed, a second request to execute a second requested transaction on the journal table; and
   generating, prior to executing the second requested transaction, a second snapshot, the second snapshot comprising a second representation of data in the journal table after the one or more requested transactions have been executed, the second snapshot stored in a third micro-partition different than the first micro-partition and the second micro-partition.

22. The non-transitory computer readable storage media of claim 21, wherein the snapshot comprises a representation of data in the journal table at a point in time, the log table comprises a listing of requested changes to the journal table since the point in time.

23. The non-transitory computer readable storage media of claim 21, further comprising:
   receiving a query; and
   generating a response to the query based on the snapshot as modified by the log table.

24. The non-transitory computer readable storage media of claim 23, wherein generating the response to the query comprises:
   generating a query task comprising instructions to read the snapshot and the log table to respond to the query; and
   assigning the query task to at least one execution node of an execution platform.

25. The non-transitory computer readable storage media of claim 23, wherein generating the response to the query comprises:
   identifying data in the snapshot that is responsive to the query; and
   based on determining that the identified data has been modified by one or more rows in the log table, reflecting the one or more rows in the response to the query.

26. The non-transitory computer readable storage media of claim 25, further comprising:
   identifying a primary key for a row of the snapshot that is responsive to the query;
   scanning the log table to determine whether one or more rows in the log table comprise the identified primary key; and
   in response to identifying one or more rows in the log table that comprise the primary key, determining that the identified data has been modified by one or more rows in the log table.

27. The non-transitory computer readable storage media of claim 21, further comprising:
   inserting, in a timestamp column in the new row, a timestamp that corresponds to the requested transaction;
   inserting, in a primary key column in the new row, a primary key of a corresponding row in the snapshot; and
   inserting, in a transaction-type column in the new row, a type of the requested transaction.

28. The non-transitory computer readable storage media of claim 21, further comprising:
   prior to receiving the one or more requests, assigning a primary key to a row in the snapshot; and
   assigning the primary key to a corresponding row in the log table such that corresponding rows in the snapshot and the log table comprise an identical unique primary key.

29. The non-transitory computer readable storage media of claim 21, wherein the snapshot is stored across a plurality of micro-partitions.

30. The non-transitory computer readable storage media of claim 21, wherein the first micro-partition and the second micro-partition cannot be updated in-place and the operations further comprise:

storing a second log table in a fourth micro-partition, the fourth micro-partition being different than the third micro-partition, wherein the third micro-partition and the fourth micro-partition cannot be updated in-place;

deleting the third micro-partition after the second log table has been stored in the fourth micro-partition; and deleting the first micro-partition after the second snapshot has been stored in the third micro-partition.

\* \* \* \* \*